United States Patent [19]

Laurent

[11] Patent Number: 4,867,217

[45] Date of Patent: Sep. 19, 1989

[54] NONPNEUMATIC ELASTIC TIRE

[75] Inventor: Daniel Laurent, Meylan, France

[73] Assignee: Compagnie Generale des Establissements Michelin - Michelin & Cie, Clermont-Ferrand, France

[21] Appl. No.: 225,179

[22] Filed: Jul. 28, 1988

[30] Foreign Application Priority Data

Aug. 4, 1987 [FR] France ................. 87 11107

[51] Int. Cl.$^4$ ............... B60C 7/08; B60B 9/04
[52] U.S. Cl. ............................ 152/5; 152/12
[58] Field of Search ............... 152/1, 5, 6, 11, 12, 152/17

[56] References Cited

U.S. PATENT DOCUMENTS

| | | | |
|---|---|---|---|
| 990,444 | 4/1911 | Lowrey | 152/5 |
| 1,345,912 | 7/1920 | Edling et al. | 152/12 |
| 1,512,820 | 10/1924 | Critchlow | 152/5 |
| 2,517,475 | 8/1950 | Frechet | 152/100 X |
| 3,234,988 | 2/1966 | Cummings | 152/12 |

FOREIGN PATENT DOCUMENTS

| | | | |
|---|---|---|---|
| 0206181 | 12/1986 | European Pat. Off. | |
| 73363 | 1/1915 | Fed. Rep. of Germany | 152/5 |
| 864699 | 5/1941 | France | 152/12 |
| 1372593 | 8/1963 | France | |
| 1408503 | 9/1964 | France | |
| 372719 | of 1906 | United Kingdom | 152/6 |
| 183765 | 8/1922 | United Kingdom | |
| 539743 | 9/1941 | United Kingdom | 152/1 |

Primary Examiner—Russell D. Stormer
Attorney, Agent, or Firm—Oblon, Spivak, McClelland, Maier & Neustadt

[57] ABSTRACT

The elastic tire (1) is composed of a plurality of elastic elements (3) placed between the nondeformable anchoring zone (2) and the tread (4). Each elastic element (3) comprises two connecting elements (34) and (35) the ends of which form a quadrilateral and an arm (31) guided by the connecting elements and joined to the tread (4).

11 Claims, 3 Drawing Sheets

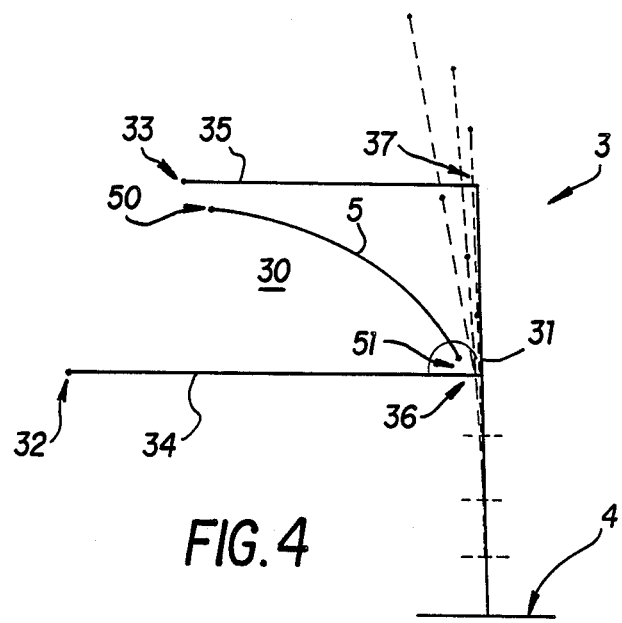
FIG. 4
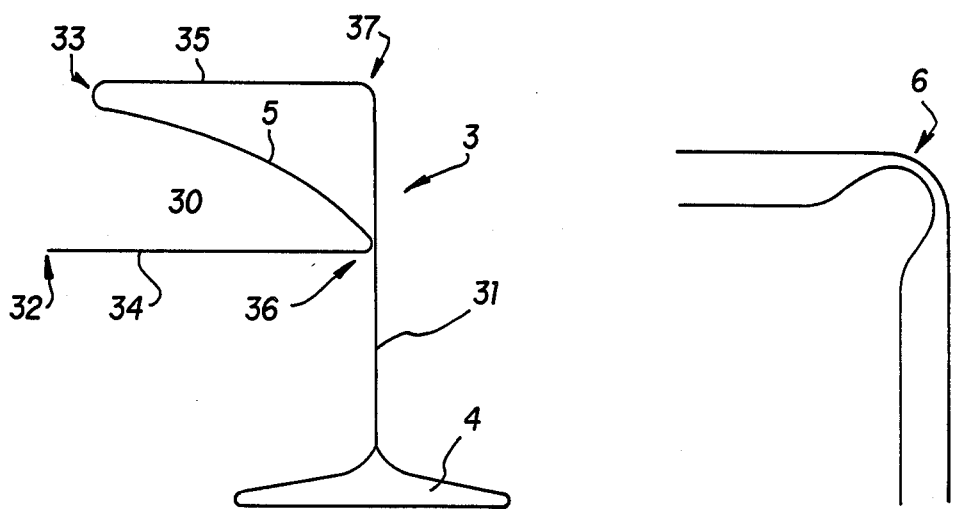
FIG. 5
FIG. 6

NONPNEUMATIC ELASTIC TIRE

FIELD OF THE INVENTION

This invention relates to nonpneumatic elastic tires able to be used as substitutes for pneumatic tires on vehicles.

BACKGROUND OF THE INVENTION

For a long time, attempts have been made to design nonpneumatic tires (i.e., tires that function without air under pressure) to overcome any problems posed by blow outs or reductions of the inflation pressure of pneumatic tires. By way of example, the proposal described in U.S. Pat. No. 2,517,475 can be cited.

OBJECT OF THE INVENTION

The object of this invention is to propose a nonpneumatic tire the characteristics of which approach those of a pneumatic tire as much as possible, particularly with respect to comfort, road stability, and behavior on the road.

SUMMARY OF THE INVENTION

The nonpneumatic elastic tire according to the invention comprises a plurality of elements that form a spring located between an approximately nondeformable anchoring zone and a tread. Each of the elements that forms a spring comprises a quadrilateral and an arm. Two vertices of the quadrilateral constituting the anchoring points of that element, and the anchoring points are immobile in relation to the axis of rotation of the tire. Two other vertices of the quadilateral constitute he attachment points of the arm, and the attachment points are mobile in relation to the axis of rotation of the tire. The radially upper attachment point of each element is connected to the radially upper anchoring point by a first connecting element, and the radially lower attachment point of each element is connected to the radially lower anchoring point by a second connecting element.

BRIEF DESCRIPTION OF THE DRAWINGS

FIGS. 4 and 5 illustrate a variant.

FIG. 6 illustrates an embodiment detail.

DETAILED DESCRIPTION OF THE PRESENTLY PREFERRED EMBODIMENTS

Figure 1:
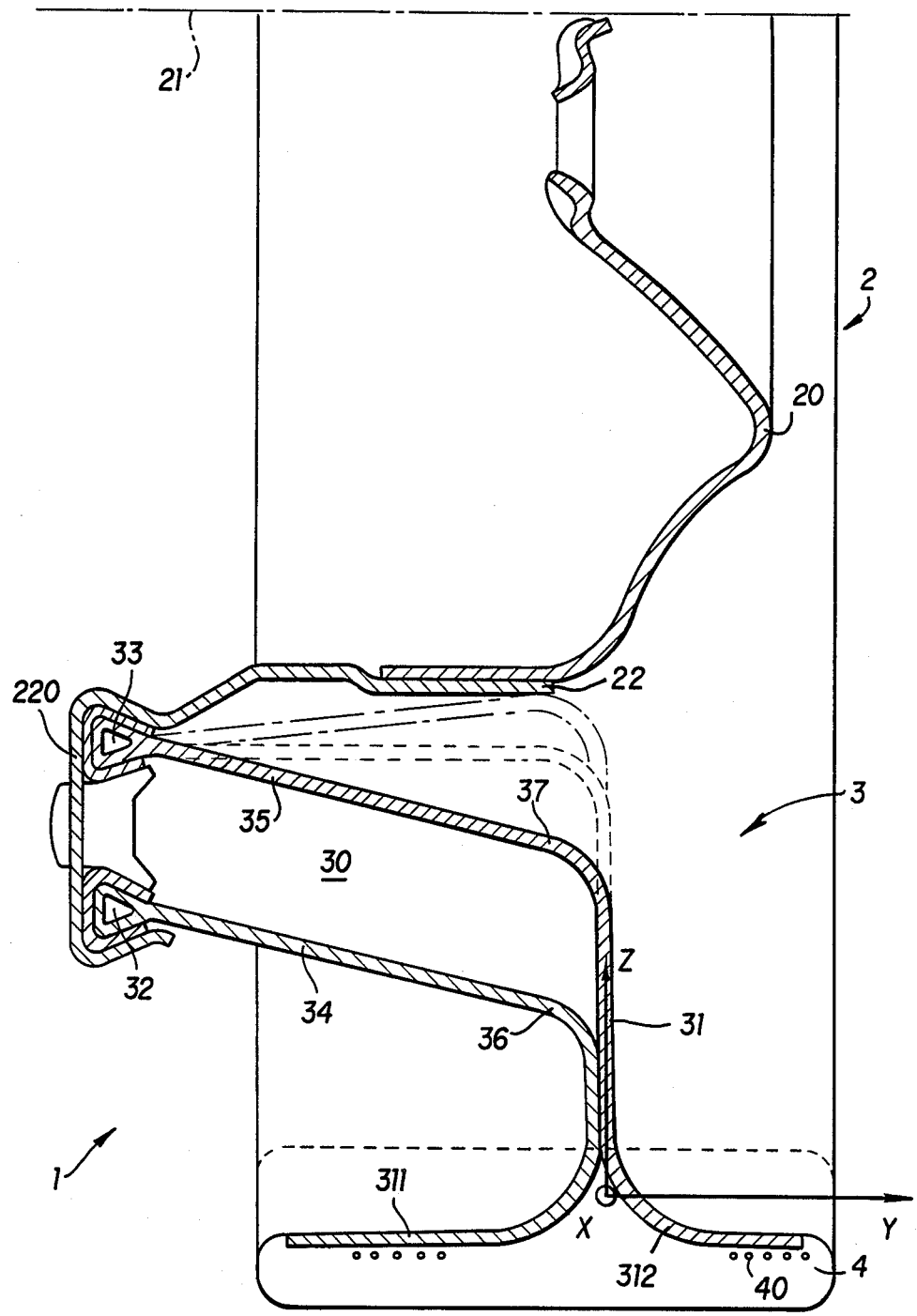
FIG. 1 is a section along a meridian plane of an elastic tire according to the invention.

The following are conventions for the representation of the forces exerted by the ground on the tire at the center of the area of contact with the ground: X represents a driving or braking (braking if negative) force, Y a crosswise stress, and Z the vertical load. X, Y, and Z form a direct trihedron.

An elastic tire 1 according to the invention makes it possible to reproduce, by nonpneumatic means, the essential characteristics of a pneumatic tire as regards insulating the vehicle with respect to the road (that is, the comfort connected with the vertical deformation of a pneumatic tire) and as regards guiding the vehicle on the road (in the longitudinal and crosswise directions). The elastic tire 1 is mounted on a nondeformable anchoring zone 2—i.e., an anchoring zone the deformations of which in normal usage can be ignored in comparison with those of the elastic tire. The nondeformable anchoring zone 2 comprises a disk 20 assuring the bonding with a hub (not shown). The disk 20 is symmetrical about an axis of rotation 21. The nondeformable anchoring zone 2 also comprises a part 22 taking the place of a rim (i.e., supporting the elastic tire 1), therefore making it possible to fasten the elastic tire 1 to the nondeformable anchoring zone 2. The fastening itself is assured by an end 220 of the part 22. All the forces due to the stresses caused by use pass through the end 220 without significant deformations resulting.

The elastic tire 1 comprises a large number of elements 3 forming a spring between the nondeformable anchoring zone 2 and a tread 4.

Each element 3 comprises a quadrilateral 30 and an arm 31. The quadrilateral 30 is defined by two vertices (or anchoring points) 32 and 33 for anchoring the element 3 to the nondeformable anchoring zone 2. The anchoring points 32 and 33 are located on the end 220 of the part 22—which, as previously stated, is substantially nondeformable. The anchoring points 32, 33 cannot, therefore, be moved in relation to the axis of rotation 21 of the nondeformable anchoring zone 2, which can be considered as a reference system. Two connecting elements 34 and 35 guide the movement of two attachment (or connection) points 36 and 37 (which can be integral connection points) in relation to the anchoring points 32 and 33, and, therefore, in relation to the nondeformable anchoring zone 2. The attachment points 36 and 37 constitute the support of the arm 31—which, as previously stated, is fastened at its radially outside end to the tread 4.

One of the main functions of the elastic tire 1 is to be able to absorb significant vertical deformations. The arm 31 is therefore advantageously oriented radially. This dictates the arrangement of the quadrilateral 30 which, in the illustration of FIG. 1, is close to a rectangle in the nominal load state (diagrammed in broken lines), which is deformed into a parallelogram when the element 3 does not carry any load (diagrammed in solid lines), and which is also deformed into a parallelogram when the deformation of the tire increases beyond the nominal load state (diagrammed in dot-and-dash lines). For questions of symmetry of revolution and bulk, each quadrilateral 30 is preferably oriented in a meridian way, as shown in all the illustrations.

The arrangement described above also imparts the desired stiffness in the crosswise direction. Under a stress oriented axially toward the inside (which occurs when the wheel is on the outside of a turn), the structure will react by a bending of the arm 31, a compression of the radially upper connecting element 34, and a stressing of the radially lower connecting element 35.

In the embodiment illustrated in FIG. 1, the capacity of the elastic tire 1 to carry a load comes from the reaction to bending of the connecting elements 34 and 35 or of at least one of them. Furthermore, all other things being equal, the reaction can be regulated in the vertical direction of the elements 3 by appropriately selecting the configuration of the four vertices 32, 33, 36, and 37 of the quadrilateral 30. Thus, as illustrated, the anchoring points 32 and 33 can be flush fittings. The attachment points 36 and 37 can determine rigid angles, the material constituting the arm 31 and the connecting elements 34 and 35 not having any discontinuity or singularity at right angles with the attachment points 36, 37 other than the change in direction in the meridian plane.

Each element 3 can, for example, consist of two parts (see FIG. 1). One of the two parts constitutes the connecting element 35, the attachment point 37, a part of the arm 31, and an extension 312 of arm 31 that participates in the bonding of the arm 31 with the tread 4. The other part constitutes the connecting element 34, the attachment point 36, a part of the arm 31, and an extension 311 of the arm 31 that also participates in the bonding with the tread 4. In the state free of any stress, the parts have the configuration illustrated in solid lines. From these choices (flush fittings at the anchoring points 32 and 33 and rigid angles at the attachment points 36 and 37) there results a mode of deformation of the connecting elements 34 and 35 (in an "S") and of the arm 31 between the attachment points 36 and 37 (also in an "S"), and therefore a certain sag for any given vertical load Z. The elements 3 can be softened by placing a joint or a pseudojoint at the attachment points 36, 37, or at one of them.

Incidently, by a "pseudojoint" is meant any arrangement that facilitates the relative angular movement of the parts or portions of parts connected by the pseudojoint. In the simplest arrangement, a pseudojoint 6 is a local thinning of the section (see FIG. 6). A pseudojoint can also be a rubber junction part of the silentbloc type. Another deformation will result from it (that of a beam that is flush mounted and loaded at its end), leading to a greater sag of the element 3 for the same load.

Figure 2:
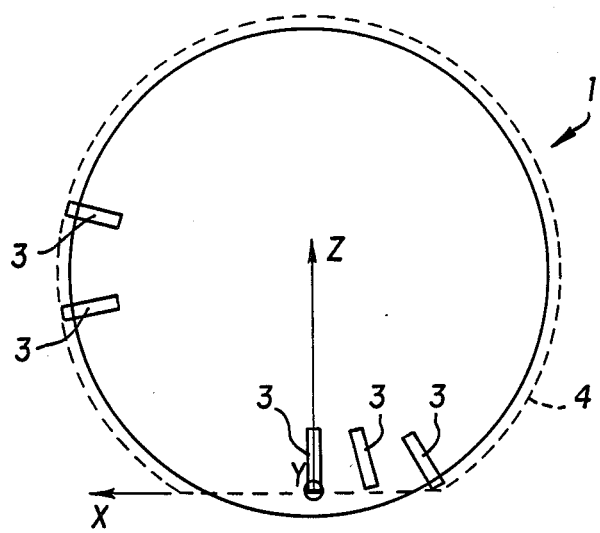
FIG. 2 is a side view of the tire.

Such a tire should still be able to transmit a torque (i.e., a force in the X direction). Each element 3, therefore, should admit only a very slight deformation under a stress of this type. To reconcile this requirement with the resistances to elastic deformation under stresses in the X and Y directions which were described above, the section of the connecting elements 34 and 35 and of the arm 31 is rectangular and flat, the large dimension of the section being oriented perpendicular to the meridian plane, as appears on simultaneous observation of FIGS. 1 and 2, and in FIG. 3. The elements 3 forming a spring therefore consist of blades the bending strength of which in the meridian plane is slight, and the bending strength of which in the rotation plane is high.

Preferably the contact of the elastic tire 1 with the road while traveling should be as continuous as possible. For this purpose, the extensions 311 and 312 of each arm 31 are located at least approximately in a cylinder (when the tire carries no load), and they are oriented so as to form chevrons. This means that the angular position of the axial end of each of the extensions 311, 312 is different from the angular position of the radial end of the arm 31 that it extends. This creates a certain covering of the radial supports imparted by the elements 3. Since the curvature of the tread 4 changes at the level of and on the edges of the zone of contact with the ground (see FIG. 2), the extensions 311 and 312 should be able to be inclined in relation to the arm 31 that they extend. This is facilitated by providing an arc-shaped connection, clearly visible in FIGS. 1 and 3.

The tread 4 is circumferentially continuous and reinforced by cords 40, giving it an at least approximately constant perimeter, as is the case in radial or belted pneumatic tires. This can result, as in ordinary pneumatic tires, in a participation in assuming the load of the zone of the tire not corresponding to the area of contact with the road. To preserve the length of the perimeter, and depending on its capacity to resist longitudinal compression, the tread 4 acts by pulling radially on the elements 5 that are outside the contact zone (see FIG. 2). A participation of all elements 3 in assuming the load is observed. It is also observed that, here again, the elastic tire 1 exhibits a behavior close to that of a pneumatic tire.

The tire proposed by this invention offers a very great latitude in design, going up to the complete separation of the tread into as many small sole pieces as there are elements 3 forming a spring. It is also possible, in tread designs, to adopt perforations assuring the removal of water radially toward the inside without having to deflect the water after impact in a direction perpendicular to the radial direction, as is the case with ordinary pneumatic tires.

It should be noted that the structure of the proposed tire, when it is associated with a circumferentially continuous tread, makes it possible also to reproduce a slip deformation/(slip angle) comparable to the corresponding deformation of a pneumatic tire. Benefit is thereby derived from deformations possible under crosswise stress of each element 3. These deformations are associated with the possible twisting deformation of the arms 31, even though the arms 31 are made in the form of blades, because such blades can twist in a suitable way. The structure proposed, therefore, offers the designer the possibility of finding a behavior very close to that of a pneumatic tire by acting, for the regulation of the various desired characteristics, on the dimensioning of the connecting elements 34 and 35, on the dimensioning of the arm 31, and on the determination, for the ends of the quadrilaterals, of a connection selected from among a real joint, a pseudojoint, and a rigid angle (flush fitting).

With a quadrilateral 30 in the shape of a parallelogram (FIG. 1), a vertical movement of the tread 4 is inevitably accompanied by its lateral movement. The lateral movement is negligible only just around the position where the quadrilateral is a rectangle, but it is not negligible over the entire desired travel, considering the slight bulk available for the unit, which preferably has to be housed in the same space as a pneumatic tire. To eliminate this drawback, the length of the two connecting elements 34 and 35, the position of the anchoring points 32 and 33, and the relative separation of the attachment points 36 and 37 are determined so that the arm 31, under pure radial stress, moves in such a way that the point of juncture with the tread 4 is moved only radially. Thus, by a kinematic correction (an example of which is illustrated in FIG. 4) the lateral movements induced at the level of the tread 4 can be made sufficiently negligible.

By way of example, an element 3 of this type can be made from a single piece, as illustrated in FIG. 5. Such a piece forms successively the inside connecting element 34, an elastic element 5 (the role of which is explained below), the upper connecting element 35, and the arm 31. The junctions are designed so as to form joints or pseudojoints at the four vertices of the quadrilateral 30 and at the ends of the elastic element 5 by providing a suitable connection between the arm 31 and the lower connecting element 34. The pseudojoints 6 are illustrated in FIG. 6, where it appears that, by a thinning of the section, the bending moment of inertia is locally reduced very considerably, at least in the plane where it is desired to allow a relative angular movement.

Figure 3:
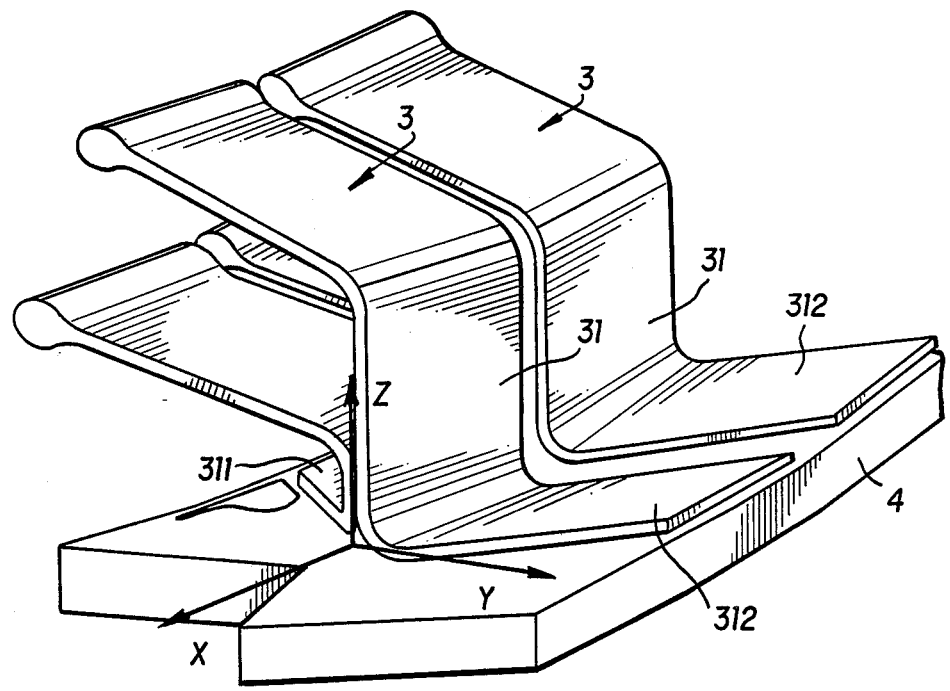
FIG. 3 is a partial representation of the tire in perspective.

Each element 3 designed according to the instructions given above exhibits a force curve Z as a function of the movement (vertical deflection) having the shape of a straight line the slope of which provides the flexibility of the spring. From the front to the back of the zones of contact with the road, the bending of the elements 3 varies between a minimum at the ends and a maximum at the center (see FIG. 2). The pressure of contact with the ground, therefore, has the shape of a parabola. Now, if a pneumatic tire behaved like a membrane, the pressure of contact with the ground would be approximately constant, equal to the inflation pressure. This characteristic, desirable in itself, is most often not attained because of the inescapable constraints of design to give pneumatic tires a sufficient endurance. Another object of the invention is to make it possible to achieve this characteristic with the elastic tire 1. For this purpose, in each element 3 an additional elastic element 5 is placed between the anchoring zone, at a point 50, and a point 51 of the element 3 that is mobile in relation to the anchoring zone. If it is desired to obtain an approximately constant effect of pressure of contact with the ground, the quadrilateral 30 must act essentially as a guide. Therefore, the anchoring points 32, 33 and the attachment points 36, 37 are pseudojoints 6, as illustrated in FIG. 6. The elastic element 5, as can be seen in FIG. 3, is a spring anchored, on the one hand, close to the radially inside anchoring point 33 and, on the other hand, close to the radially outside attachment point 36. The elastic element 5 consists of a blade, stressed in bending-compression at the ends approaching the points 50 and 51. This blade is stressed in an eccentric manner, or it comprises an initial centering in the non-stressed state, to control the direction in which it is deformed. Taking into account the relative constancy of the reaction force of a blade under this mode of stress, and of the kinematic correction made by the selection of the implantation of the points 50 and 51 at the ends of the elastic element 5, each element 3 behaves in the radial direction like a spring with zero slope that is, like a spring having a constant reacting force. The load Z is therefore assumed by a gradual bending of the tire, multiplying the number of elements 3 intervening up to complete assumption of the load. In the case where the tread 4 has an at least approximately constant perimeter, it is important that the elements 3 be able to accept at least a slight radial lengthening and to make their contribution in assuming the load.

Therefore, it is seen that the proposed structure makes it possible to approach very closely the behavior of a pneumatic tire and that, in addition, it makes it possible for the designer to regulate separately the various characteristics of resistance to deformation along the three axes, and to resistance to rotation around the same three axes, by acting on the dimensioning of the blades and on the selection of joints constituting the vertices of the quadrilateral. This makes it possible to make elements 3 which are sufficiently enduring to resist the aggressive environment in which they are called on to operate.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A nonpneumatic elastic tire having an axis of rotation, said nonpneumatic elastic tire comprising:
   (a) a nondeformable anchoring zone;
   (b) a tread; and
   (c) a plurality of elements forming springs disposed between said nondeformable anchoring zone and said tread, each one of said plurality of elements comprising:
      (i) a quadrilateral mounted on said nondeformable anchoring zone and
      (ii) an arm extending radially between said quadrilateral and said tread and connecting said quadrilateral to said tread, wherein:
   (d) two vertices of said quadrilateral constitute radially inner and outer anchoring points for the one of said plurality of elements of which that quadrilateral is a part, said anchoring points being radially fixed in relation to the axis of rotation of said nonpneumatic elastic tire;
   (e) the other two vertices of said quadrilateral constitute radially inner and outer connecting points for the corresponding arm, said attachment points being radially movable in relation to the axis of rotation of said nonpneumatic elastic tire;
   (f) said arm is fastened at its radially outer end to said tread;
   (g) the radially inner attachment point of each of said quadrilaterals is connected to the radially inner anchoring point of that one of said quadrilaterals by a first connecting element; and
   (h) the radially outer attachment point of each one of said quadrilaterals is connected to the radially outer anchoring point of that one of said quadrilaterals by a second connecting element.

2. A nonpneumatic elastic tire according to claim 1 wherein each of one of said quadrilaterals is oriented in a plane which comprises the axis of rotation.

3. A nonpneumatic elastic tire according to claim 2 wherein:
   (a) said first and second connecting elements and said arms have sections;
   (b) the sections of said first and second connecting elements and of said arms are rectangular, having a large dimension and a small dimension, and flat; and
   (c) the large dimensions of said sections are oriented perpendicularly to a plane that comprises the axis of rotation.

4. A nonpneumatic elastic tire according to claim 1 wherein:
   (a) the junction of each arm with said tread comprises two extensions of said arm and
   (b) all the extensions are placed at least approximately in a cylinder.

5. A nonpneumatic elastic tire according to claim 4 wherein the connection between each extension and said arm is arc-shaped.

6. A nonpneumatic elastic tire according to claim 1 wherein the length of said first and second connecting elements, the position of said anchoring points, and the relative separation of said attachment points are determined so that each one of said arms, under pure radial stress, moves in such a way that the point of junction with said tread is moved only radially.

7. A nonpneumatic elastic tire according to claim 1 wherein at least one of the vertices of each one of said quadrilaterals is composed of a pseudojoint.

8. A nonpneumatic elastic tire according to claim 1 wherein each one of said plurality of elements comprises an additional elastic element placed between:

(a) the anchoring zone of that element and (b) a point of that element that is mobile in relation to its anchoring zone.

9. A nonpneumatic elastic tire according to claim 8 wherein each one of said elastic elements comprises a blade stressed at one end.

10. A nonpneumatic elastic tire according to claim 8 wherein each one of said plurality of elements behaves in the radial direction like a spring having a constant reacting force.

11. A nonpneumatic elastic tire according to claim 4 wherein the extensions are oriented so as to form chevrons.

* * * * *

UNITED STATES PATENT AND TRADEMARK OFFICE
CERTIFICATE OF CORRECTION

PATENT NO. : 4,867,217
DATED : September 19, 1989
INVENTOR(S) : Daniel Laurent

It is certified that error appears in the above-identified patent and that said Letters Patent is hereby corrected as shown below:

In column 1, line 18, delete "nonp-neumatic" and insert --non-pneumatic--.

In column 1, line 33, delete "he" and insert --the--.

Signed and Sealed this

Twentieth Day of November, 1990

*Attest:*

HARRY F. MANBECK, JR.

*Attesting Officer*

*Commissioner of Patents and Trademarks*